US006351577B1

(12) United States Patent
Aksyuk et al.

(10) Patent No.: US 6,351,577 B1
(45) Date of Patent: Feb. 26, 2002

(54) SURFACE-MICROMACHINED OUT-OF-PLANE TUNABLE OPTICAL FILTERS

(75) Inventors: Vladimir Anatolyevich Aksyuk, Piscataway; David John Bishop, Summit; Anat Sneh, Branchburg, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/211,185

(22) Filed: Dec. 14, 1998

(51) Int. Cl.[7] .................................................. G02B 6/12
(52) U.S. Cl. ............................. 385/15; 385/14; 385/18; 385/19; 372/20
(58) Field of Search .............................. 385/14, 15, 18, 385/19; 372/20, 99, 107

(56) References Cited

U.S. PATENT DOCUMENTS 4,269,481 A  * 5/1981 Yeh et al. .................... 350/356
5,739,945 A    4/1998 Tayebati
5,949,801 A  * 9/1999 Tayebati ....................... 372/20
6,157,025 A  * 12/2000 Katagiri et al. .............. 250/226

OTHER PUBLICATIONS

M.C. Larson et al., "Broadly–Tunable Resonant–Cavity Light–Emitting Diode," IEEE Photonics Technology Letters, vol. 7, No. 11, pp. 1267–1269, Nov. 1995.
E.C. Vail et al., "GaAs Micromachined Widely Tunable Fabry–Perot Filters," Electronics Letters, vol. 31, No. 3, pp. 228–229, Feb. 1995.
P. Tayebeti et al., "Widely Tunable Fabry–Perot Filter Using Ga(Al)As–AlO$_x$ Deformable Mirrors," IEEE Photonics Technology Letters, vol. 10, No. 3, pp. 394–396, Mar. 1998.
J. Peerlings et al., "Long Resonator Micromachined Tunable GaAs–AlAs Fabry–Perot Filter," IEEE Photonics Technology Letters, vol. 9, No. 9, pp. 1235–1237, Sep. 1997.
K.S.J. Pister et al., "Microfabricated Hinges," Sensors and Actuators A, vol. 33, pp. 249–256, 1992.
A. Spisser et al., "Highly Selective and Widely Tunable 1.55–$\mu$m InP/Air–Gap Micromachined Fabry–Perot Filter for Optical Communications," IEEE Photonics Technology Letters, vol. 10, No. 9, pp. 1259–1261, Sep. 1998.

* cited by examiner

Primary Examiner—Frank G. Font
Assistant Examiner—Roy M. Punnoose
(74) Attorney, Agent, or Firm—Ryan, Mason & Lewis, LLP

(57) ABSTRACT

The invention provides tunable optical filters which incorporate a surface-micromachined out-of-plane plate having a moveable membrane with a high reflective (HR) coated mirror. The mirror defines one side of a Fabry-Perot (FP) filter cavity and is movable in a direction along an axis of the filter cavity. The other side of the filter cavity is defined by a second HR-coated mirror. In one illustrative embodiment, a first plate is formed on a substrate, and then subsequently released from the substrate and secured in a plane orthogonal to the substrate. The first HR-coated mirror is formed as part of a movable membrane supported in an opening through the first plate. The second mirror is formed on a second plate secured in another plane orthogonal to the plane of the substrate, such that the filter cavity is defined horizontally between the first and second mirrors. In another embodiment, the second mirror is formed on an endface of an external fiber, such that light from the fiber can pass from the second mirror through an opening in the second plate to the first mirror. In another possible embodiment, the second plate is eliminated and the second mirror is formed on the substrate. The first plate is then arranged over the second mirror, in a plane parallel to the substrate, and separated from the substrate by spacers, such that the filter cavity is defined vertically.

15 Claims, 5 Drawing Sheets

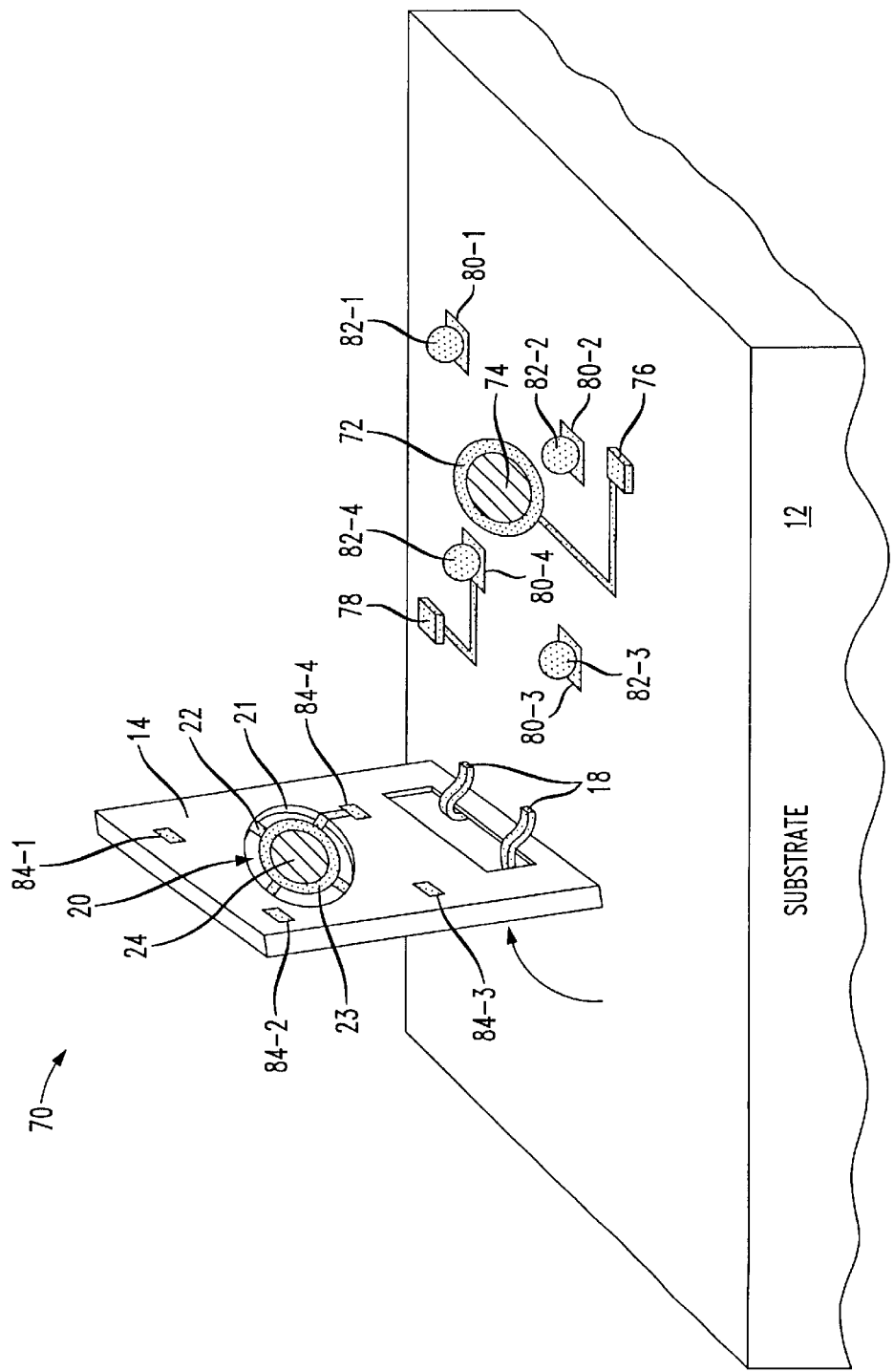

Si₃N₄ ▓  Poly 0 ▨  SiO₂ ▢  Poly 1 ◪  Poly 2 ▓  SACRIFICIAL LAYER ▨

SURFACE-MICROMACHINED OUT-OF-PLANE TUNABLE OPTICAL FILTERS

FIELD OF THE INVENTION

The present invention relates generally to optical devices and more particularly to micromachined tunable optical filters and techniques for fabricating such filters.

BACKGROUND OF THE INVENTION

Tunable optical filters are useful devices for wavelength-division-multiplexing (WDM) systems, performing functions such as optical monitoring, channel selection in wavelength-based routing, noise filtering and coherent crosstalk reduction. As the number of wavelengths used in these systems grows, it is particularly desirable to have inexpensive tunable filters. Existing tunable filters have a relatively high unit cost, due to the labor-intensive fabrication and assembly processes which are used. Among these, tunable Fabry-Perot (FP) filters based on mechanical scanning of a FP cavity length are generally best suited to meet the high performance required in WDM systems, due to important optical properties such as, for example, low loss, polarization insensitivity, large tuning range and high bandwidth resolution. In addition to the problem of high cost, the tuning speed of bulk mechanical filters is typically rather slow, i.e., on the order of milliseconds, as the tuning process requires moving a relatively large mass.

A tunable FP filter is characterized by a cavity enclosed between two mirrors. The transmission function of a symmetric FP filter with identical mirrors is given by:

$$T = \frac{(1-R)^2}{(1-R)^2 + 4R\sin^2(\delta/2)} \quad (1)$$

where R is the mirrors' power reflectivity and δ is the accumulated phase a light wave acquires in each round-trip inside the cavity, given by:

$$\delta = \frac{4\pi n L}{\lambda} \quad (2)$$

Here, n is the index of refraction of the material comprising the cavity (n=1 for air), L is the cavity length, and λ is the operating wavelength. The resonant wavelengths of this filter are determined by the phase δ given above, and the separation between the wavelengths, called the free-spectral-range (FSR), is given approximately by:

$$\Delta\lambda_{FSR} = \frac{\lambda^2}{2nL} \quad (3)$$

The passband width of the resonant peak is determined by the filter finesse F, which is a measure of the overall cavity and mirror losses:

$$\delta\lambda = \frac{\Delta\lambda_{FSR}}{F} \quad (4)$$

For an ideal lossless filter, the finesse is given by F=πR/(1−R). The wavelengths that the filter transmits can be tuned, among other ways, by mechanically tuning the cavity length.

One type of conventional optimized tunable filter design approach sets the free spectral range to be about equal to the required tuning range. For WDM systems, a typical tuning range is in the range of 40–100 nm, and the center wavelength is approximately 1.55 μm. Using Eq. (3), this translates to a cavity length of 10–30 μm. If the WDM system uses 0.8 nm (100 GHz) channel spacing, a tunable filter used as a channel selector would require a filter bandwidth≦0.5 nm, and from Eq. (4), a finesse of 80–200. This means that the required mirror reflectivity would be close to 98–99%.

In order to reduce cost substantially and also to enable faster switching speeds, micromachined FP filters have been developed. Examples of micromachined FP filters are described in M. C. Larson, and J. S. Harris Jr., "Broadly-tunable resonant-cavity light-emitting diode," IEEE Photon. Technol. Lett., Vol. 7, p. 1267, 1995; E. C. Vail et al., "GaAs micromachined widely tunable Fabry-Perot filters," Electron. Lett., Vol. 31, p. 228–229, 1995; P. Tayebati et al., "Widely tunable Fabry-Perot filter using Ga(Al)As—AlO$_x$ deformable mirrors," IEEE Photonic Technol. Lett., Vol. 10, pp. 394–396, 1998; J. Peerlings et al., "Long resonator micromachined tunable GaAs—AlAs Fabry-Perot filter," IEEE Photonic Technol. Lett., Vol. 9, pp. 1235–1237, 1997; and A. Spisser et al., "Highly selective and widely tunable 1.55 μm InP/air-gap micromachined Fabry-Perot filter for optical communications," IEEE Photonic Technol. Lett., Vol. 10, pp. 1259–1261, 1998.

These micromachined filters share a common design approach, which defines vertically the entire FP structure, including its cavity and mirrors, by a sequence of multi-layer thin-film depositions on a wafer substrate. In this design approach, both top and bottom cavity mirrors are typically comprised of several quarter-wave-thick layers with alternating high and low refractive indices, while the layer which is used to define the cavity is a sacrificial layer which is later etched away in one of the final processing steps. The etching process forms a membrane or a cantilever structure. Cavity tuning is obtained electrically by pulling the membrane or the cantilever toward the substrate with electrostatic force, which changes the cavity spacing between the mirrors.

The vertical design approach for micromachined filters restricts the initial cavity length to the thickness of the sacrificial layer, which is limited in most cases to only a few microns at the most. This results in a very large spacing between the periodic transmission peaks of the filter, and as a consequence, a very high mirror reflectivity is required to obtain a filter bandwidth which is narrow enough to meet dense WDM requirements. A typical cavity length in this type of micromachined filter may vary in the range of 2–5 μm, which translates to a FSR of 250–600 nm. To achieve a filter bandwidth of 0.5 nm, the required finesse and mirror reflectivity are 500–1200 and 99.5–99.8%, respectively.

Such high mirror reflectivities can be obtained with a large number of quarter wave mirrors, or alternatively by substantially increasing the index contrast between the layers, as described in, e.g., U.S. Pat. No. 5,739,945 issued to P. Tayebati and entitled "Electrically tunable optical filter utilizing a deformable multi-layer mirror," and the above-cited A. Spisser et al. reference. Either of these approaches, however, unduly complicates the fabrication process. Furthermore, the filter is exposed to substantially higher throughput losses in the presence of any type of defect or deviation from an ideal FP structure, e.g., mirror curvature or tilt, and intracavity diffraction of a non-collimated illumination. As the channel spacing of WDM systems becomes even smaller, the requirements on the filter finesse and reflectivity become even more difficult to achieve with this short cavity design. It should also be noted that since the absolute change in cavity length required to shift the filter passband over a certain wavelength range is a linear function of the initial cavity length, shorter cavities are more sensitive to small fluctuations in cavity length. For typical micromachined filters with cavity length of only a few microns, a cavity length change on the order of 0.1 nm (1 Å) would shift the filter passband by 0.1 nm, making it difficult to stabilize the filter transmission wavelength.

As noted previously, a conventional non-micromachined design approach involves choosing the transmission peak spacing to be about equal to the required tuning range, such that a typical WDM requirement in the range of 40–100 nm translates to cavity spacing of 10–30 $\mu$m, and respective mirror reflectivities of 98–99%. In an attempt to achieve this type of cavity spacing for a micromachined tunable filter, a design disclosed in the above-cited J. Peerlings et al. reference patterns the top and bottom mirrors separately on two different substrates, and then assembles them together with a cavity spacing that is defined by fixed spacers between the substrates. In the disclosed device, the cavity length was 30 $\mu$m and the resulting filter periodicity was 56 nm. The obtained filter bandwidth was higher than expected from the mirror reflectivity, only 1.2 nm instead of about 0.5 nm, due to mirror tilt which probably developed during the assembly. However, this type of design also has a number of drawbacks. The additional assembly step adds to the device cost, since careful assembly is required to avoid degradation in device performance. In addition, two substrates need to be processed rather than one, and since tuning speed is determined by the thickness of the structure that is being pulled electrostatically, one of the substrates requires substantial thinning to allow for reasonable tuning speeds on the order of milliseconds.

It is apparent from the above that a need exists for an improved micromachined tunable optical filter which can provide a cavity length which is not unduly limited, e.g., to the thickness of the sacrificial layer, without the problems associated with using multiple substrates to form a single filter.

SUMMARY OF THE INVENTION

The present invention provides tunable micromachined optical filters in which cavity length is not subject to the undue restrictions generally associated with the above-described prior art devices. A tunable optical filter in accordance with the invention incorporates a first surface-micromachined out-of-plane plate having a moveable membrane which includes a first high reflective (HR) coated mirror. The mirror defines one side of a Fabry-Perot (FP) filter cavity and is movable in a direction along an axis of the filter cavity. The other side of the filter cavity is defined by a second HR-coated mirror. The filter cavity may be defined horizontally or vertically, depending on the configuration and arrangement of the second mirror relative to the first mirror.

In a first illustrative embodiment of the invention, the first plate is formed on a substrate, and subsequently released from the substrate and secured in a plane orthogonal to the substrate. The first HR-coated mirror is formed as part of the movable membrane supported in an opening through the first plate. The second mirror is part of a second plate which is formed on the substrate, and subsequently released from the substrate and secured in another plane orthogonal to the plane of the substrate, such that the filter cavity is defined horizontally between the first and second mirrors. As voltage is applied between an electrode associated with the moveable membrane and a facing electrode on the second plate, the first mirror is pulled toward the second plate, thus changing the cavity length in accordance with the applied bias level. This in turn tunes the transmission peaks of the filter to varying wavelength positions.

In a second illustrative embodiment, the second mirror is formed on an endface of an external fiber, such that light from the fiber can pass from the second mirror through an opening in the second plate to the first mirror. The filter cavity in this embodiment is also defined horizontally, but between the first mirror of the first plate and the second mirror on the fiber endface. The bias that controls the membrane displacement is applied between the membrane electrode and a second electrode which can be positioned anywhere between the two mirrors, or even outside the cavity, as long as it does not block the light path inside the cavity. For example, the second electrode can be defined on the second plate, or on any other structure, including structures that are not micromachined out of the substrate but are instead attached manually to the substrate or other suitable surface.

In a third illustrative embodiment, the second plate is eliminated and the second mirror is formed on the substrate. The first plate is then arranged over the second mirror, in a plane parallel to the plane of the substrate, and separated from the substrate by spacers, such that the filter cavity is defined vertically. The cavity length is determined initially by the spacers, which can be defined using various techniques, e.g., with surface micromachining or by external application to the substrate. One possible technique is to use solder bumps both as spacers and as a mechanism to provide electrical connection between the first plate electrodes and corresponding electrodes formed on the substrate. The moveable membrane associated with the first plate is used as a tuning mechanism, as in the other illustrative embodiments.

BRIEF DESCRIPTION OF THE DRAWINGS

FIG. 3 shows a third illustrative embodiment of a micromachined out-of-plane tunable optical filter in accordance with the invention, in a vertical cavity configuration with one mirror supported by an out-of-plane plate and another mirror formed on a substrate.

DETAILED DESCRIPTION OF THE INVENTION

Figure 1:
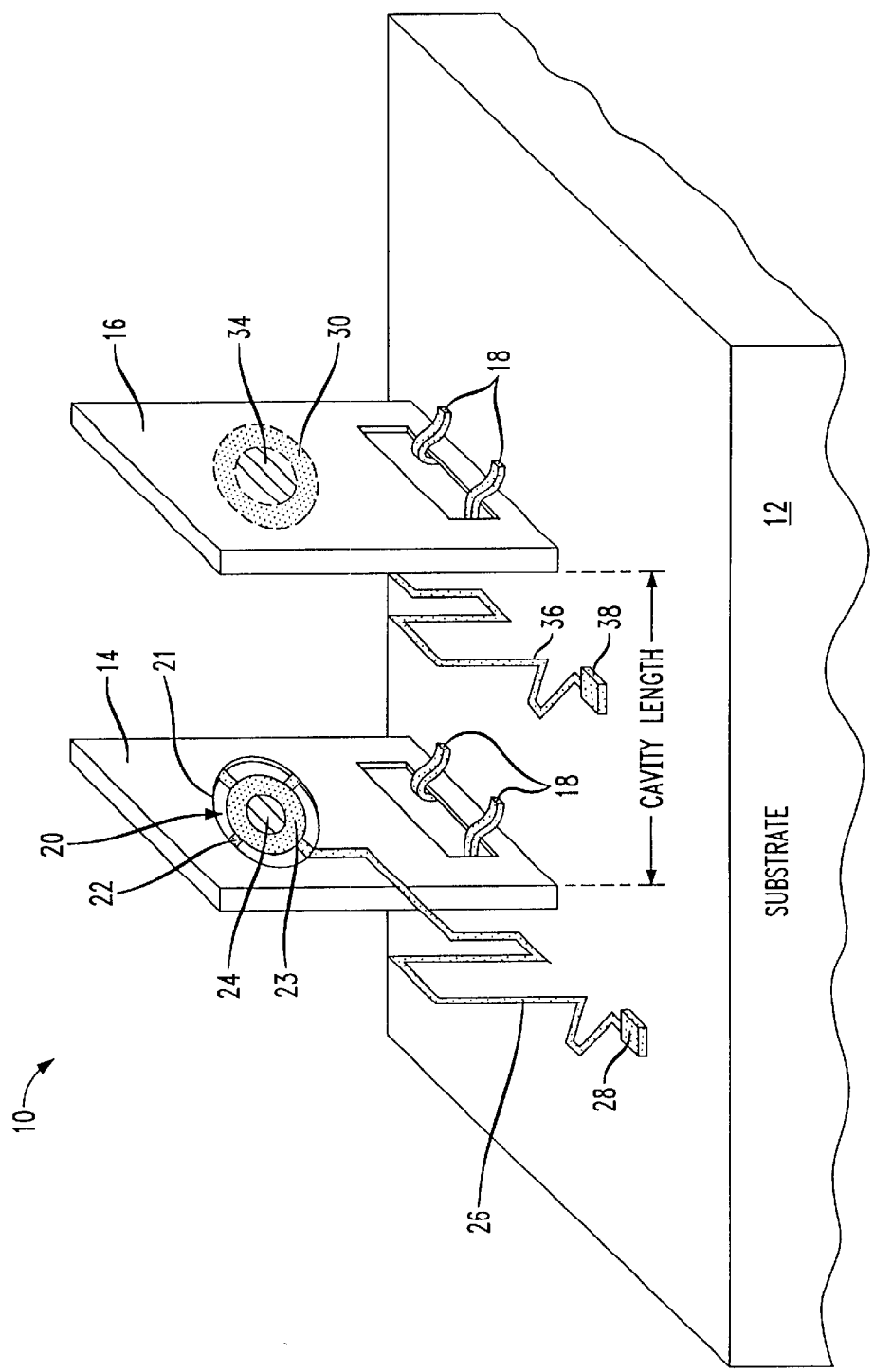
FIG. 1 shows a first illustrative embodiment of a micromachined out-of-plane tunable optical filter in accordance with the invention, in a horizontal cavity configuration with two out-of-plane plates each supporting a mirror.

FIG. 1 shows a horizontal cavity tunable FP optical filter 10 in accordance with a first illustrative embodiment of the invention. The filter 10 includes a substrate 12 and a pair of plates 14, 16. The plates 14, 16 are free to rotate around a fixed axis after their release from the substrate 12, but remain secured thereto by microhinges 18, as will be described in conjunction with FIGS. 4(*a*)–(*f*) below. The plates 14, 16 are shown in FIG. 1 as "flipped" out of the plane of the substrate 12, i.e., as out-of-plane plates fixed at an orthogonal position relative to the plane of the substrate. In other words, each of the plates 14, 16 is arranged in a plane which is at a 90° angle relative to the plane of the substrate. The plate 14 includes a moveable membrane 20 which is supported in a circular opening 21 of the plate by a number of flexible support arms 22. The portion of the membrane 20 which is visible in FIG. 1 includes a membrane electrode 23 and a high reflective (HR) coated mirror 24. Another view of the membrane 20 is shown in FIG. 4(f). The membrane electrode 23 is coupled via a contact transfer arm 26 to a contact pad 28 formed on the substrate 12. The plate 16 includes a plate electrode 30 and an HR-coated mirror 34, both formed on a surface of the plate 16 which faces the plate 14. The plate electrode 30 and mirror 34 are shown in dashed outline since they are not directly visible in the perspective view of FIG. 1. The electrode 30 is coupled via a contact transfer arm 36 to a contact pad 38 formed on the substrate 12.

In operation, light passes into and out of the filter 10 through one or more optical fibers, which are not shown in FIG. 1. For example, a first fiber may be arranged on the left side of the plate 14 with an end aligned with the mirror 24, and a second fiber may be arranged on the right side of plate 16 with an end aligned with the mirror 34. In such an arrangement, light from the first fiber may be incident on the mirror 24 through the optical window covered by the mirror 24, and light from the second fiber may be incident on the mirror 34 through the optical window of the plate 16. In other embodiments, a single fiber may be used both to introduce light into and remove light from the filter 10. The one or more fibers may be secured to the substrate or other surface of the filter 10 using conventional techniques.

An FP filter cavity is defined in filter 10 horizontally between the two mirrors 24, 34 associated with the respective out-of-plane plates 14, 16. As is shown more clearly in FIG. 4(f), the mirror 24 covers an optical window through the plate 14. It should be noted that the term "optical window" as used herein refers generally to an area through which light can pass without large loss, and does not have to include an opening in the plate. In the FIG. 1 embodiment, each of the plates 14, 16 includes an optical window, and the mirror area of each plate is always greater than or equal to the corresponding optical window area. The membrane 20, and thus the mirror 24, is free to move along the horizontal axis of the filter cavity to provide tunability.

Actuation of the membrane 20 and its corresponding mirror 24 in the filter 10 is achieved electrostatically in this embodiment. As a bias voltage is applied between the membrane electrode 23 associated with plate 14 and the facing electrode 30 formed on the plate 16, via the respective contact pads 28, 38 and corresponding contact transfer arms 26, 36, the membrane 20 and its mirror 24 are pulled toward the plate 16, thus changing the cavity length in accordance with the applied bias level. This in turn tunes the transmission peaks of the filter 10 to varying wavelength positions. In other embodiments, magnetic actuation may be used to displace the membrane 20 and its mirror 24. Magnetic actuation can be implemented, for example, by integrating coils around a membrane which is coated with a magnetic material, such that a current applied to the coils produces a magnetic field which exerts a force that causes the membrane to deflect.

Figure 2:
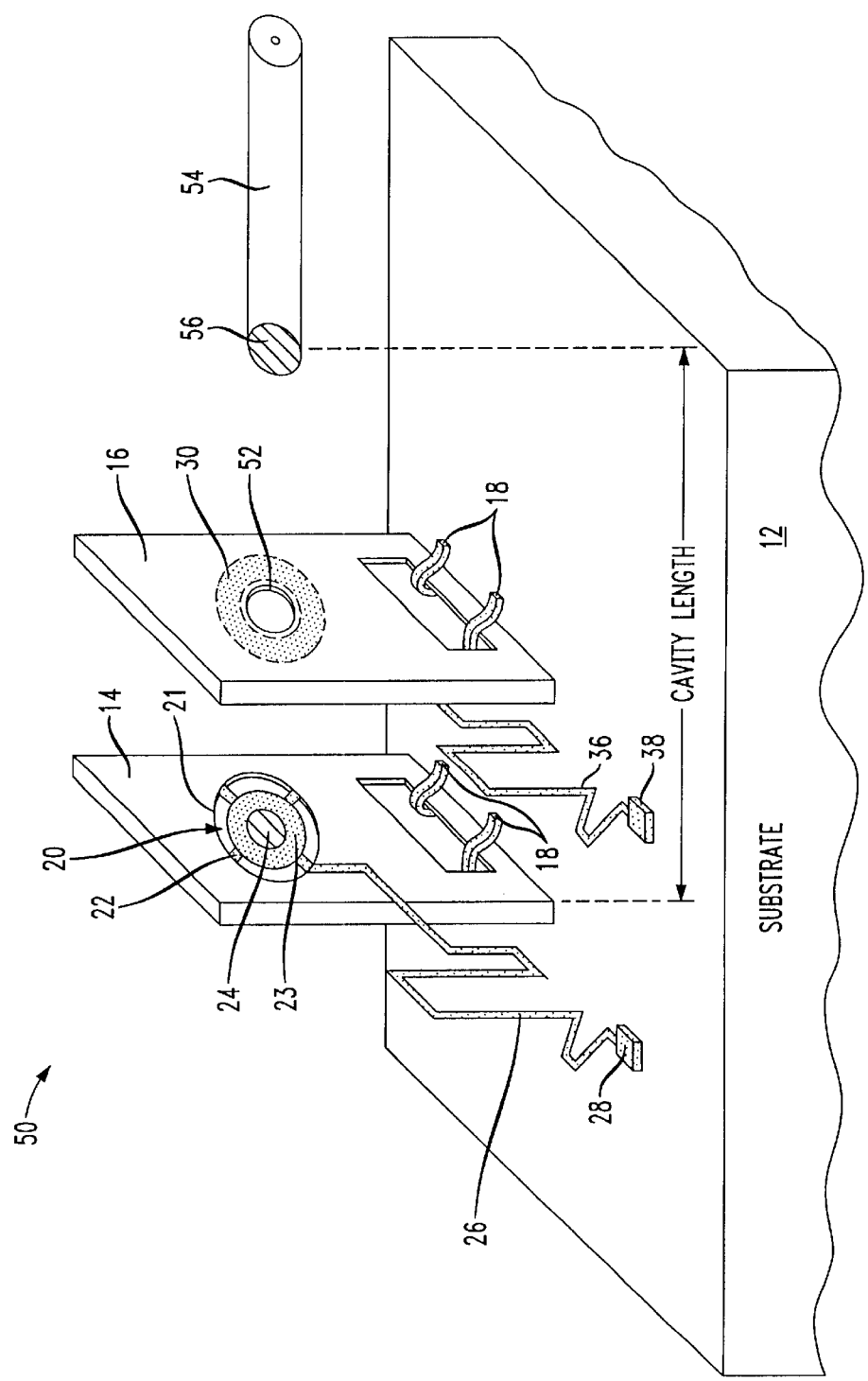
FIG. 2 shows a second illustrative embodiment of a micromachined out-of-plane tunable optical filter in accordance with the invention, in a hybrid horizontal cavity configuration with one mirror supported by an out-of-plane plate and another mirror formed on a coupling fiber endface.

FIG. 2 shows a hybrid horizontal cavity tunable FP optical filter 50 in accordance with a second illustrative embodiment of the invention. The filter 50 includes the substrate 12 and the pair of plates 14, 16. The plate 14 and the components associated therewith are configured in substantially the same manner as in the embodiment of FIG. 1. The plate 16 includes an opening 52 formed therethrough, instead of mirror 34 as in the FIG. 1 embodiment. An optical fiber 54 arranged on the right side of the plate 16 as shown has an HR-coated endface 56 aligned with the opening 52 in plate 16. Although not shown in FIG. 2, conventional mechanisms for securing the fiber 54 to the substrate 12 or other suitable surface may be included. The FP filter cavity is again defined horizontally, but in this case is defined between the mirror 24 associated with plate 14 and the HR-coated endface 56 of the fiber 54. The bias that controls the displacement of membrane 20 and its mirror 24 is applied between the membrane electrode 23 and the plate electrode 30. It should be noted that the plate electrode 30 can be positioned anywhere between the mirror 24 and the HR-coated endface 56, or even outside the cavity, as long as it does not block the light path inside the cavity. For example, instead of being defined as shown on plate 16, the electrode 30 can be defined on any other structure, including structures that are not micromachined out of the substrate but are instead, e.g., attached manually to the substrate surface.

FIG. 3 shows a vertical cavity tunable FP optical filter 70 in accordance with a third illustrative embodiment of the invention. The filter 70 includes the substrate 12 and plate 14. The plate 14 is configured to include the membrane 20 in opening 21, the flexible support arms 22, the membrane electrode 23, and the HR-coated mirror 24, all as previously described. However, in this embodiment, the FP filter cavity in the filter 70 is defined vertically. An electrode 72 and HR-coated mirror 74 are formed on an upper surface of the substrate 12. The electrode 72 is connected to a contact pad 76 formed on the substrate 12. Another contact pad 78 formed on the substrate 12 is coupled one of four contacts 80-i, i=1, 2, 3, 4, i.e., to contact 80-4. Associated with each of the contacts 80-i is a corresponding supporting spacer 82-i, and a corresponding contact 84-i formed on a surface of the plate 14 as shown.

The plate 14 that contains the moveable membrane 20 is released out of the plane of the substrate 12 and is subsequently moved, in a direction indicated generally by the arrow, such that the plate 14 is arranged over the mirror 74 on top of the supporting spacers 82-i. In this position, the mirror 24 is aligned with the mirror 74. The filter cavity spacing in the filter 70 is determined initially by the spacers 82-i, which can be defined using various techniques, e.g., either with surface micromachining or by external application to the substrate. One preferred technique is to use solder bumps both as spacers and as a mechanism to transfer electrical connections between the contacts 84-i on plate 14 and the corresponding contacts 82-i on the substrate 12. Additional spacers may be used to provide tighter control on the level of parallelism between the two mirrors 24 and 74. The microhinges 18 that secure the plate 14 to the substrate 12 may be configured to provide sufficient freedom of movement to the plate 14 that will allow it to flip over the bottom mirror 72. The microhinges can alternatively be broken, e.g., by shear motion, after defining the proper cavity configuration.

In the embodiments of FIGS. 1–3, the substrate 12 may be formed from materials that are suitable for micromachining techniques. Such materials include semiconductors such as silicon, gallium arsenide or indium phosphide, dielectrics such as glass or quartz, or metals. Silicon is a preferred material for applications requiring particularly low cost manufacturing. The plate or plates in these embodiments can be flipped out of the plane of the substrate by various techniques, preferably using the microhinges 18. The operation of the microhinges is described in greater detail in K. S. J. Pister et al., "Microfabricated hinges," Sens. and Actuators A, Vol. 33, p. 249–256, 1992, which is incorporated by reference herein. The action of bringing a plate to its out-of-plane position can be obtained manually, e.g., by manipulating the plates with micro-probes, or by self-assembly techniques. The latter may include techniques such as using microactuators to push the plate out of the substrate plane, or pushing the plate with the bending moment provided in stressed auxiliary plates upon their release, as described in U.S. Pat. No. 5,994,159, issued Nov. 30, 1999, filed in the name of inventors V. Aksyuk and D. J. Bishop, and entitled "Self-assembling micro-mechanical device." The microhinges 18 may be replaced with or used in combination with flexure bars connected to the plate. Such flexure bars can be configured to cause the plate to flip out of the substrate plane when an external force is applied to deform or flex the bars by techniques such as those noted above.

The HR-coated mirrors 24, 34 and 74 in the embodiments of FIGS. 1–3 may be comprised of, e.g., one or more layers of dielectric materials or metals. Preferably the mirrors 24, 34 and 74 comprise a stack of dielectric layers with alternating high and low refractive index to achieve high reflectivity and low loss. If silicon is used as a substrate, the preferred mirror stack is silicon (which may include polysilicon) and silicon dioxide high/low index pairs. The mirror layers may be deposited on the substrate or on top of the structural and sacrificial layers which are used to define the plates and other related structures. These mirror layers can be deposited before the release process, i.e., the release of the plate 14 from the substrate 12 and the release of all other structures that require release from the substrate 12, in which case the mirror layers should be encapsulated in a way that will prevent their erosion during the etching process of the sacrificial layers for release of the plate 14. The mirror layers may also be deposited after the release process is completed. In either case, stress-relief techniques may be used to prevent bowing or warping of the membrane surface following the mirror coating deposition and release of the membrane. Such techniques may include relieving the stress in the mirror coating only, or balancing the coating stress by depositing additional films on the supporting structural layers. Built-in stress and the resulting mirror bowing may actually be used to focus the optical beam inside the FP resonator and to form a confocal cavity structure, as described in, e.g., A. Yariv, "Optical Electronics," 3rd Ed., Chapter 4, Holt-Saunders: New York, 1985, which is incorporated by reference herein.

The plate 14 with the moveable membrane 20 in the embodiments of FIGS. 1–3 may consist of one or more layers, and its shape and size may vary according to the desired design and application. The optical window covered by the mirror 24 should generally be at least as large as the optical beam area that illuminates the FP filter. For a collimated beam, this may be a circular area with a diameter varying anywhere from few tens of microns to few millimeters. A non-collimated beam may also be used, and such a beam may emanate from, e.g., a standard single mode fiber, expanded mode fiber or a multimode fiber. The corresponding optical window size is generally between a few microns to a few tens of microns.

FIGS. 4(a) through 4(f) show an exemplary processing sequence for fabricating the out-of-plane plate 14 and its associated components in the filters of FIGS. 1–3. This processing sequence makes use of a well-established surface micromachining process described in, e.g., D. A. Koester et al., "Multi-user MEMS process (MUPS) introduction and design rules," Rev. 4, Microelectronics Center of North Carolina (MCNC) MEMS Technology Applications Center: Research Triangle Park, N.C., 1996, which is incorporated by reference herein. Other MEMS (Microelectromechanical Systems) fabrication processes may also be used to form tunable optical filters in accordance with the invention, such as those processes described in, e.g., M. Madou, "Fundamentals of Microfabrication," CRC Press: Boca Raton, Fla., 1997, which is incorporated by reference herein.

Figure 4A:
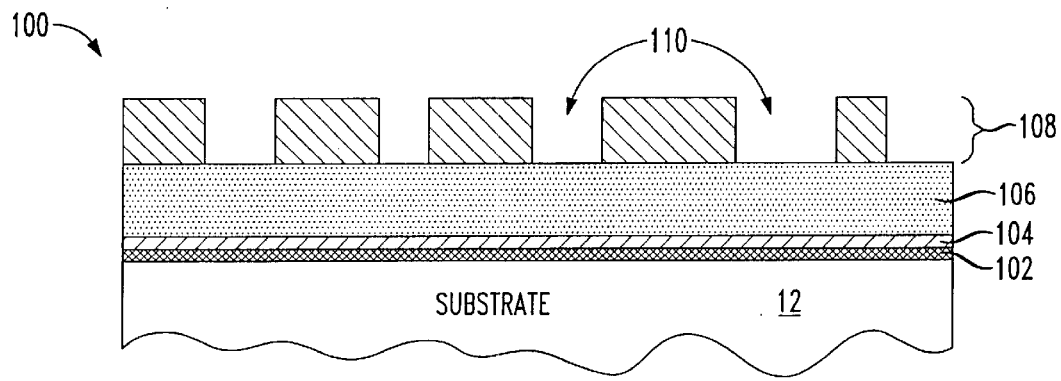
FIGS. 4(*a*) through 4(*f*) illustrate the steps of a fabrication process for the out-of-plane plate and its associated mirror and other components in a tunable optical filter in accordance with the invention.
Figure 4B:
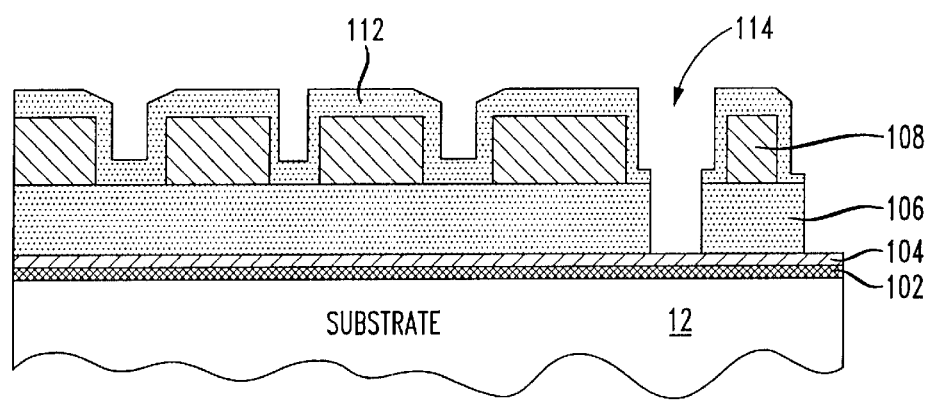
Figure 4C:
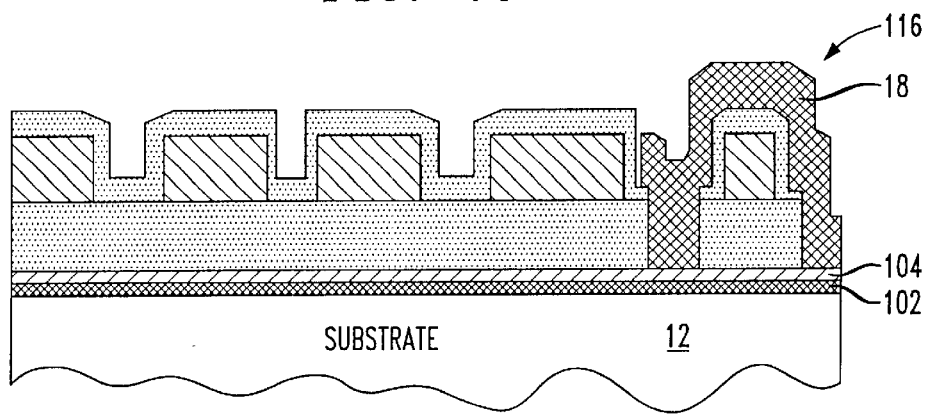

Referring to FIG. 4(a), a silicon nitride layer 102 is formed on the substrate 12 to provide electrical isolation between the substrate 12 and overlying subsequently-formed structural polysilicon layers. A thin layer of polysilicon (Poly 0) 104 is deposited on top of the silicon nitride layer 102 as in a standard process sequence and can be used as a ground plane. A first layer of structural polysilicon (Poly 1) 108 is deposited on top of a first oxide sacrificial layer 106 formed over the Poly 0 layer 104. Opening holes 110 are patterned through the Poly 1 layer 108 using hard mask lithography, as described in, e.g., the above-cited D. A. Koester et al. reference. As shown in FIG. 4(b), a second sacrificial oxide layer 112 is deposited on top of the patterned Poly 1 layer 108 and one or more opening holes 114 are etched to allow anchoring of a subsequent polysilicon layer to the substrate 12. Next, a second structural polysilicon layer (Poly 2) 116 is deposited and one or more microhinges 18 are defined in the Poly 2 layer 116, resulting in the structure shown in FIG. 4(c). As previously described, the microhinge 18 is used to secure a plate, e.g., plate 14, to the substrate 12. Other mechanisms for securing the plate 14 to the substrate 12 while allowing out-of-plane movement of the plate may also be used, such as the above-noted flexure bars.

Figure 4D:
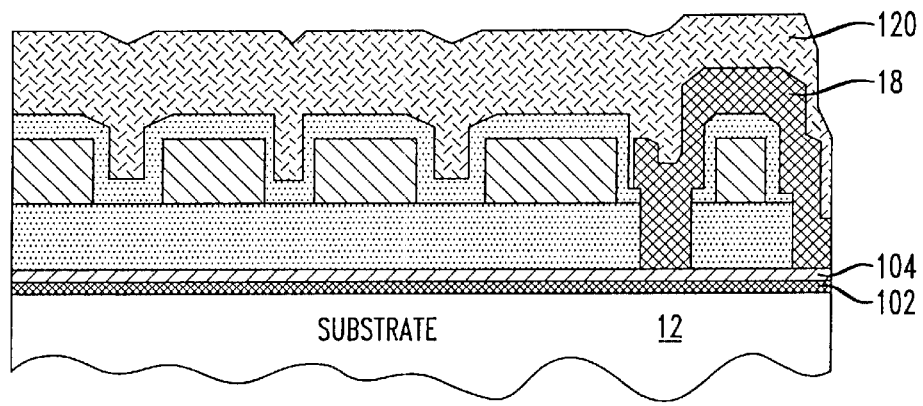

At this point in the fabrication process, all of the structural layers have been defined as part of the standard processing as described in the D. A. Koester et al. reference, and additional processing steps are performed to obtain HR-coated mirror 24. As noted above, the mirror may be formed of multiple layers. The mirror layers can be applied using a variety of deposition techniques, such as plasma-enhanced chemical vapor deposition (PECVD), atomic layer epitaxy (ALE), e-beam deposition, and sputtering. Also as noted previously, several types of films can be used in forming the mirror 24, including HR dielectric coatings. In this example, as shown in FIG. 4(d), an additional sacrificial layer 120 is applied before the mirror deposition operation, to fill in any openings associated with the plate 14 and to provide support to the subsequently-formed mirror layers.

Figure 4E:
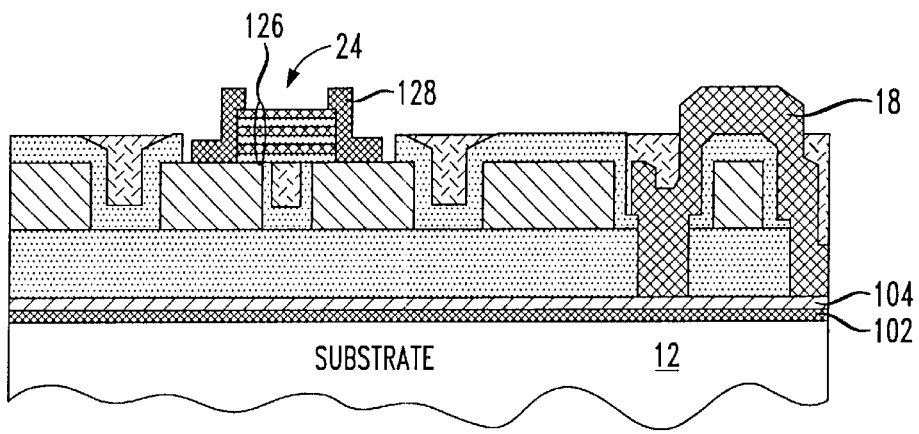
Figure 4F:
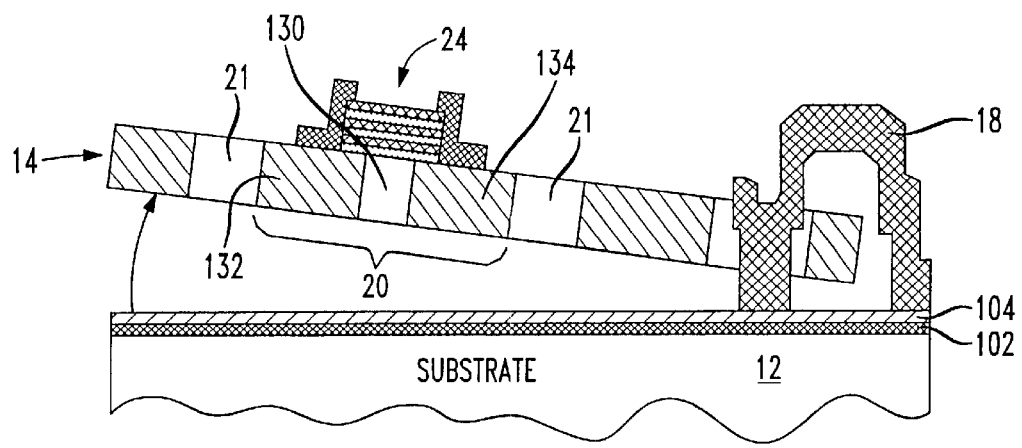

The additional sacrificial layer 120 deposited as shown in FIG. 4(e) is then planarized. The planarization process should provide a smooth surface on which the mirror layers are later deposited and can be obtained by several techniques on various types of film. These may include planarization techniques known in the microelectronics industry, as described in the above-cited M. Madou et al. reference, such as applying spin on glass (SOG) or polyimides to fill the gaps in the underlying layers, followed by an etchback process, or growing self-planarized layers in processes such as electron-cyclotron resonance CVD (ECRCVD). A method more commonly used in the micromachining industry is chemical-mechanical polishing (CMP), also described in the above-cited M. Madou et al. reference. When using CMP, the polishing is done until the highest feature on the substrate, i.e., the Poly 2 microhinge 18 in this example, is reached. A conventional etchback operation may then be performed to reach the desired surface level.

FIG. 4(e) shows the HR-coated mirror 24 formed using multiple layers 126 of HR coating material. After planarization is achieved, the mirror layers 126 of the mirror 24 are deposited and patterned to fit the desired optical window. The last layer, i.e., the uppermost layer, of the mirror layers 126 should be resistant to the release etch process, or otherwise protected by an auxiliary layer that can be removed after release. Any other erodable mirror layers, i.e., any of the mirror layers that may be eroded during the sacrificial layer release etch, should also be protected. As shown in FIG. 4(e), this protection may be provided using plugs 128, i.e., additional films which are applied to the periphery of the optical window 130 and can withstand the release etch. Examples of suitable plugs include metals, polyimides, photoresists, etc. Preferably, the plug film is stress free, or alternatively it may be used to balance any residual stress in the mirror 24. The erodable mirror layers may also be protected by encapsulating them with the last layer, which should be deposited by techniques providing good step coverage, such as CVD or ALE. It should be noted that similar processing steps may be used to form other mirrors in a tunable filter in accordance with the invention, e.g., mirror 74 in the embodiment of FIG. 3.

FIG. 4(f) shows the released structure of the plate 14, after all the sacrificial layers have been removed by etching. The mirror 24 covers the optical window 130 and is part of the membrane 20. The membrane 20 also includes Poly 1 regions 132 and 134 on either side of the optical window 130 and within the opening 21. It is assumed that the sectional view of FIG. 4(f) is taken such that the support arms 22 are not visible. It should also be noted that the membrane electrode 23 is omitted from the FIG. 4(f) view for clarity of illustration. However, electrode 23 or other suitable electrical connections to the membrane 20 may be formed using conventional process techniques. For example, electrode 30 may be formed on the Poly 1 layer, or on both the Poly 1 and Poly 2 layers, outside of the area of the optical window 130. After the plate 14 is released from the substrate 12 in the release etch process, it can be flipped out of the plane of the substrate and fixed to any desired position, such as a position orthogonal to the plane of the substrate as in the embodiments of FIGS. 1 and 2, or a position substantially parallel to the plane of the substrate as in the embodiment of FIG. 3. In the orthogonal position, the plate 14 generally remains secured to the substrate 12 via the microhinge 18, but in the parallel position, as previously noted in connection with the embodiment of FIG. 3, the connection with the microhinge 18 may be broken.

The invention has been described above in conjunction with a number of exemplary tunable optical filter configurations. However, it should be understood that the invention is not limited to use with the particular configurations shown. For example, the processing operations of FIGS. 4(a) to 4(f) are shown by way of example only, and many other types of processing operations may be used to produce tunable optical filters in accordance with the invention. These and numerous other alternative embodiments within the scope of the following claims will be apparent to those skilled in the art.

What is claimed is:

1. A tunable optical filter comprising:

a substrate; and a first plate which is formed on the substrate and subsequently at least partially released from the substrate and arranged in a plane other than that in which it was formed, wherein the first plate has a first mirror associated therewith which defines one side of a filter cavity and is movable in a direction along an axis of the filter cavity, and further wherein the other side of the filter cavity is defined by a second mirror;

wherein the first plate when arranged in a plane other than that in which it was formed is secured to the substrate via a microhinge which permits movement of the plate about a point on the substrate.

2. The tunable optical filter of claim 1 wherein the filter is a Fabry-Perot filter.

3. A tunable optical filter comprising:

a substrate; and a first plate which is formed on the substrate and subsequently at least partially released from the substrate and arranged in a plane other than that in which it was formed, wherein the first plate has a first mirror associated therewith which defines one side of a filter cavity and is movable in a direction along an axis of the filter cavity, and further wherein the other side of the filter cavity is defined by a second mirror;

wherein the first plate when arranged in a plane other than that in which it was formed is in a plane which is substantially orthogonal to the plane of the substrate.

4. A tunable optical filter comprising:

a substrate; and a first plate which is formed on the substrate and subsequently at least partially released from the substrate and arranged in a plane other than that in which it was formed, wherein the first plate has a first mirror associated therewith which defines one side of a filter cavity and is movable in a direction along an axis of the filter cavity, and further wherein the other side of the filter cavity is defined by a second mirror;

wherein the first plate when arranged in a plane other than that in which it was formed is in a plane which is substantially parallel to the plane of the substrate.

5. A tunable optical filter comprising:

a substrate; and a first plate which is formed on the substrate and subsequently at least partially released from the substrate and arranged in a plane other than that in which it was formed, wherein the first plate has a first mirror associated therewith which defines one side of a filter cavity and is movable in a direction along an axis of the filter cavity, and further wherein the other side of the filter cavity is defined by a second mirror;

wherein the second mirror defining the other side of the filter cavity is formed on a second plate which is formed on the substrate and subsequently at least partially released from the substrate and arranged in a plane other than that in which it was formed.

6. A tunable optical filter comprising:

a substrate; and a first plate which is formed on the substrate and subsequently at least partially released from the substrate and arranged in a plane other than that in which it was formed, wherein the first plate has a first mirror associated therewith which defines one side of a filter cavity and is movable in a direction along an axis of the filter cavity, and further wherein the other side of the filter cavity is defined by a second mirror;

wherein the second mirror defining the other side of the filter cavity is formed on an endface of a coupling fiber adjacent an opening in a second plate which is formed on the substrate and subsequently at least partially released from the substrate and arranged in a plane other than that in which it was formed, such that light from the optical fiber passes through the opening to the first mirror associated with the first plate.

7. A tunable optical filter comprising:

a substrate; and a first plate which is formed on the substrate and subsequently at least partially released from the substrate and arranged in a plane other than that in which it was formed, wherein the first plate has a first mirror associated therewith which defines one side of a filter cavity and is movable in a direction along an axis of the filter cavity, and further wherein the other side of the filter cavity is defined by a second mirror;

wherein the second mirror defining the other side of the filter cavity is deposited on the substrate.

8. A tunable optical filter comprising:

a substrate; and a first plate which is formed on the substrate and subsequently at least partially released from the substrate and arranged in a plane other than that in which it was formed, wherein the first plate has a first mirror associated therewith which defines one side of a filter cavity and is movable in a direction along an axis of the filter cavity, and further wherein the other side of the filter cavity is defined by-a second mirror;

wherein the mirror is formed as part of a movable membrane supported in an opening through the first plate, such that the membrane is moveable in the direction along the axis of the filter cavity.

9. A method of forming a tunable optical filter, the method comprising the steps of:

forming a first plate on a substrate;

at least partially releasing the first plate from the substrate; and arranging the at least partially released first plate in a plane other than that in which it was formed, such that a first mirror associated with the first plate defines one side of a filter cavity and is movable in a direction along an axis of the filter cavity, and further wherein the other side of the filter cavity is defined by a second mirror;

wherein the arranging step includes adjusting a position of the plate using a microhinge which permits movement of the plate about a point on the substrate.

10. A method of forming a tunable optical filter, the method comprising the steps of:

forming a first plate on a substrate;

at least partially releasing the first plate from the substrate; and arranging the at least partially released first plate in a plane other than that in which it was formed, such that a first mirror associated with the first plate defines one side of a filter cavity and is movable in a direction along an axis of the filter cavity, and further wherein the other side of the filter cavity is defined by a second mirror;

wherein the arranging step further includes arranging the first plate in a plane which is substantially orthogonal to the plane of the substrate.

11. A method of forming a tunable optical filter, the method comprising the steps of:

forming a first plate on a substrate;

at least partially releasing the first plate from the substrate; and arranging the at least partially released first plate in a plane other than that in which it was formed, such that a first mirror associated with the first plate defines one side of a filter cavity and is movable in a direction along an axis of the filter cavity, and further wherein the other side of the filter cavity is defined by a second mirror;

wherein the arranging step further includes arranging the first plate in a plane which is substantially parallel to the plane of the substrate.

12. A method of forming a tunable optical filter, the method comprising the steps of:

forming a first plate on a substrate;

at least partially releasing the first plate from the substrate;

arranging the at least partially released first plate in a plane other than that in which it was formed, such that a first mirror associated with the first plate defines one side of a filter cavity and is movable in a direction along an axis of the filter cavity, and further wherein the other side of the filter cavity is defined by a second mirror;

forming a second plate on the substrate such that the second mirror is formed on the second plate;

at least partially releasing the second plate from the substrate; and arranging the at least partially released second plate in a plane other than that in which it was formed.

13. A method of forming a tunable optical filter, the method comprising the steps of:

forming a first plate on a substrate;

at least partially releasing the first plate from the substrate;

arranging the at least partially released first plate in a plane other than that in which it was formed, such that a first mirror associated with the first plate defines one side of a filter cavity and is movable in a direction along an axis of the filter cavity, and further wherein the other side of the filter cavity is defined by a second mirror; and forming the second mirror defining the other side of the filter cavity on an endface of a coupling fiber adjacent an opening in a second plate which is formed on the substrate and subsequently at least partially released from the substrate and arranged in a plane other than that in which it was formed, such that light from the optical fiber passes through the opening to the first mirror associated with the first plate.

14. A method of forming a tunable optical filter, the method comprising the steps of:

forming a first plate on a substrate;

at least partially releasing the first plate from the substrate;

arranging the at least partially released first plate in a plane other than that in which it was formed, such that a first mirror associated with the first plate defines one side of a filter cavity and is movable in a direction along an axis of the filter cavity, and further wherein the other side of the filter cavity is defined by a second mirror; and forming on the substrate the second mirror defining the other side of the filter cavity.

15. A method of forming a tunable optical filter, the method comprising the steps of:

forming a first plate on a substrate;

at least partially releasing the first plate from the substrate;

arranging the at least partially released first plate in a plane other than that in which it was formed, such that a first mirror associated with the first plate defines one side of a filter cavity and is movable in a direction along an axis of the filter cavity, and further wherein the other side of the filter cavity is defined by a second mirror; and forming the first mirror as part of a movable membrane supported in an opening through the first plate, such that the membrane is moveable in the direction along an axis of the filter cavity.

* * * * *